Figures 1, 2, 3:
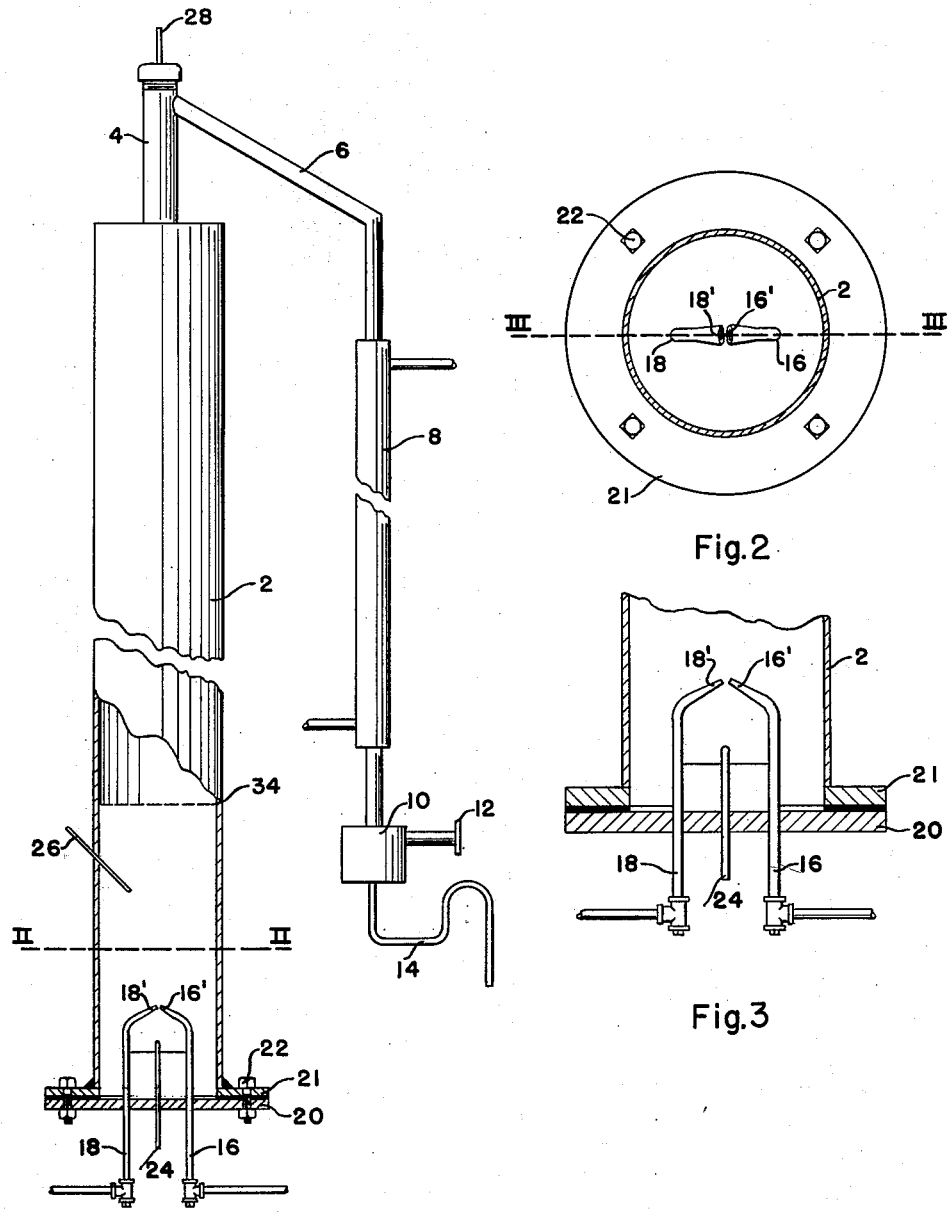

INVENTORS
THEODORE F. KUNTZ
GEORGE J. DISBERGER
ARTHUR L. COCHERELL

Patented Apr. 27, 1954

2,676,998

UNITED STATES PATENT OFFICE 2,676,998

CHLORINOLYSIS OF METHANE

Theodore F. Kuntz, Painesville, George J. Disberger, Perry, and Arthur L. Cocherell, Painesville, Ohio, assignors to Diamond Alkali Company, Cleveland, Ohio, a corporation of Delaware Application January 13, 1951, Serial No. 205,872

4 Claims. (Cl. 260—654)

This invention relates to a method and apparatus for the gas phase chlorinolysis of methane, and more particularly relates to a method which employs a fixed fluidized catalyst bed technique in the gas phase, thermally-induced, chlorinolysis of methane, and to an apparatus in which the chlorinolysis of methane and other normally gaseous hydrocarbons may be carried out by a fixed fluidized catalyst bed technique.

Several methods for the gas phase, thermally-induced, chlorinolysis of methane, also termed "exhaustive chlorination of methane," have heretofore been proposed, none of which methods has met with widespread acceptance in the chemical arts. This circumstance apparently arises out of the nature of the reaction of chlorine with hydrocarbons generally, and particularly the reaction of chlorine with methane, in which all of the hydrogen atoms attached to the single carbon atom occupy primary positions. In the chlorination of hydrocarbons, as between hydrogen atoms in primary, secondary and tertiary positions attached to a carbon atom, the primary hydrogen atoms require the highest energy of activation and release the greatest amount of energy upon substitution of chlorine for hydrogen. This release of energy may, under certain circumstances, become so violent as to result in an explosion with the attendant pyrolysis of the reaction products of the chlorination reaction, whereby low yields of the desired higher chlorinated derivatives of methane are obtained. For example, in the chlorination of methane, the reaction may become so violent as apparently to cause complete decomposition of the chlorinated products, whereby substantially only carbon, in the form of soot, and hydrogen chloride are obtained as the reaction products.

Various attempts to arrive at a solution to these problems have included diluting the reactant mixtures of methane and chlorine with suitable materials, such as inert gases, providing a bed of catalyst material having progressively increasing catalytic activity toward the chlorination reaction, and progressively chlorinating methane by introducing gaseous chlorine at spaced points along a tubular reactor, whereby the concentration of chlorine in the chlorine-methane mixture or chlorine-chlorinated methane mixture is always below the concentration required to cause explosions at reaction temperatures. For example, it has heretofore been proposed to dilute the reactant mixture of a hydrocarbon and chlorine with part of the hydrogen chloride evolved in the chlorination reaction. Another proposal includes obtaining a mixture of carbon tetrachloride and perchlorethylene, either one in predominating proportion, by diluting the reactant mixture of methane and chlorine with a desired end product, i. e., either carbon tetrachloride or perchlorethylene, and carrying out the reaction above 500° C. in a reaction zone in which no catalytic material is employed.

Still another method proposes passing a reactant mixture of four volumes of chlorine to one volume of methane through a reaction zone in which a bed of catalyst material comprises layers or zones of substances of widely different chemical nature and having different degrees of catalytic activity toward the chlorination reaction. In this method the mixture of chlorine and methane is passed through the bed of catalyst material in the direction of progressively increasing catalytic activity within the bed, whereby it is said that flame propagation and explosions within the catalyst bed are prevented.

It has now been found that in a fixed fluidized catalyst bed, the chlorinolysis of methane may be so controlled as to produce rather unusual results. For example, when a gaseous stream of a mixture of chlorine and methane is passed in contact with a fluidized mass of surface-catalyst particles in a reaction zone maintained at a temperature substantially within the range of 300°–370° C., said mass of particles being buoyantly supported by and suspended in said zone by the force of the motion of said stream and of the reaction products of the components thereof, the molar ratio of methane to chlorine in said stream being substantially within the range of 1:3.6 to 1:4, the reaction products of said mixture contain approximately 90% of a mixture consisting of carbon tetrachloride and perchlorethylene. Contrary to what might be expected from the above-prescribed conditions, and the known fact that the pyrolysis temperature of carbon tetrachloride is of the order of 450° C., the proportion of perchlorethylene in the reaction products decreases and the proportion of carbon tetrachloride increases as the temperature of the chlorinolysis reaction increases within the above-noted range up to about 360° C. At temperatures of about 370° C., and above, the proportion of these two compounds in the reaction products falls off sharply.

In addition, it has been found that in such a fixed fluidized catalyst bed technique for the chlorinolysis of methane, the mixing of the reactants is preferably effected within the fluidized bed of surface-catalyst particles. In the step of thus mixing the reactants, it is advantageous, moreover, to introduce the chlorine and methane as separate streams, which impinge upon each other in substantial opposition within the fluidized bed of surface-catalyst particles, to promote high yields of the chlorinolysis products, carbon tetrachloride and perchlorethylene, and to prevent flame propagation within the reaction zone and thus prevent explosions.

The method of the present invention may conveniently be described in connection with the apparatus diagrammatically illustrated in the attached drawings, in which:

Fig. 1 is a side elevation of a preferred form of an apparatus shown with parts broken away, Fig. 2 is a section taken on the line II—II of Fig. 1, and Fig. 3 is a section taken on the line III—III of Fig. 2.

In the apparatus, the reactor 2 is provided with reactant conduits 16 and 18 for the introduction of separate streams of reactants in proximate opposition to each other within the reactor as shown, and below the level assumed by the mass of surface-catalyst particles therein while in a state of rest. In the form shown (see Fig. 3), reactor 2 is provided with a pair of reactant conduits 16 and 18, entering the reactor through base plate 20, attached to reactor 2 by means of flange 21 and nut and bolt assemblies 22; extensions 16' and 18' of reactant conduits 16 and 18 are bent from the vertical toward each other in such manner that the gas streams issuing therefrom are in proximate opposition, so as to effect thorough mixing of the reactant gases and promote fluidization of the catalyst particles. The termini of extensions 16' and 18' are preferably slightly flattened, as shown in Fig. 2, to provide relatively long, narrow orifices in order to increase the velocity of the reactant gases entering the reaction chamber.

Reactor 2 is in fluid connection with exhaust conduit 4 having thermometric means 28 inserted therein for the purpose of determining the temperatures of the exhaust gases from the reactor 2; conduit 6 leads from exhaust conduit 4 to condenser 8, which in turn is connected with accumulator 10, having vent 12 for separating the hydrogen chloride formed during the chlorinolysis reaction from the condensed reaction products. Accumulator 10 also has conduit 14 for the purpose of conducting the condensed reaction products to suitable means for effecting separation and purification thereof. Thermometric means 24 and 26 may be provided for determining the temperature of the fluidized catalyst bed within the reactor and as a means for controlling the progress of the chlorinolysis reaction during the reaction period.

In the practice of the method of the present invention, employing the apparatus of Figs. 1, 2, and 3, the reactor 2 is partially filled with a suitable surface-catalyst material, preferably having a particle size within the range of 60–100 mesh. The extent to which the reactor 2 is filled with catalyst material is shown at 34 of Fig. 1, which level is approximately one-third of the total height of the reactor.

The mass of catalyst particles is preheated to a temperature within a few degrees centigrade of the desired reaction temperature. Such preheating may suitably be effected by passing a stream of heated gases through reactant conduits 16 and 18 and into the mass of catalyst particles until the desired bed temperature is reached, or a mixture of reactant gases, which react exothermically at room temperature as well as at higher temperatures, may be employed to achieve the desired bed temperatures.

After preheating the fluidized bed of surface-catalyst particles, separate streams of chlorine and methane are introduced through reactant conduits 16 and 18, and thus into the reactor 2, in such a manner that the gas streams are directed toward each other at substantially the same level, somewhat above the base plate 20 of the reactor 2. The chlorination reaction is initiated and thereafter is moderated by the movement of the fluidized mass of surface-catalyst particles which effects rapid heat transfer within the body of reactants and reaction products. Molecular fragmentation and recombination of the molecular fragments of the carbon tetrachloride or of the lower chlorinated derivatives of methane is apparently effected, and appreciable amounts of perchlorethylene are produced along with the carbon tetrachloride.

The temperature at which the chlorinolysis is carried out in accordance herewith may suitably be varied substantially within the range of 300°–370° C. The proportion of carbon tetrachloride in the reaction products produced within this temperature range varies from about 40% at the lower end of the range to about 80% at the upper end of the range, and at the same time the proportion of perchlorethylene produced within this temperature range varies from about 45% at the lower limit of the range to about 14% at the upper limit of the range. The temperature values given herein as the temperatures of the reaction zone at which the chlorinolysis reaction is carried out are average temperatures of the moving catalyst bed, it having been found that the temperature differential over the catalyst bed amounts to 5°–10° C. in extreme cases. Moreover, it will be realized by those skilled in the art that within the region of the impingement of the gas streams upon each other, which is a region of high momentary concentration of reactants, momentary temperatures may, and probably do, approach the temperatures at which molecular fragmentation of carbon tetrachloride and some of the lower chlorinated derivatives of methane takes place. It will also be realized by those skilled in the art that in the chlorination of methane in gaseous mixtures containing methane and chlorine in substantially the theoretical amount required to effect the complete substitution of chlorine for hydrogen in the methane molecule, a dynamic system obtains. It is for this reason that the terms "momentary concentration of reactants" and "momentary temperatures are employed to designate the conditions existing within the region of maximum concentration of methane and chlorine, since once the reaction is initiated, the concentrations of methane and chlorine continually decrease and the concentration of the products of the chlorination reaction continually increases.

In the method of the present invention, temperatures above 370° C., and this appears to be sharply defined, promote explosions of the mixture of reactants unless diluent gases, such as inert gases, or one of the end products of the reaction in gas form, are provided in the mixture of reactants. However, merely preventing explosions at temperatures above 370° C. is not sufficient to promote high yields of the desired end products, it having been found that in the practice of the present invention, the yield of carbon tetrachloride and perchlorethylene drops sharply as the reaction temperature increases above about 360° C., with or without the use of diluents in the mixture of reactants, and that above 370° C., methyl chloride and methylene chloride are produced in appreciable amounts. It is therefore preferable to carry out the reaction substantially within the range of 340°–360° C., in which range diluents are not required and maximum chlorination efficiency is obtained with a minimum of heavy ends (hexachlorethane and hexachlorbenzene).

The surface-catalyst material employed in the method of the present invention may be any of many surface-catalyst materials, preferably a material having a particle size of the order of 60–100 mesh and a material chosen for its surface characteristics such as high adsorptivity, and fluidization characteristics such as relatively low bulk density. For example, carbon (so-called "rough" carbon), charcoal, synthetic aluminum silicate, synthetic silica-alumina gel, silica gel, and the hydrate of natural aluminum-magnesium silicate known as "fuller's earth," have been found suitable. The fuller's earth type of surface-catalyst material is especially useful in the method of the present invention since this material combines high surface adsorptive capacity with relatively low bulk density and is readily fluidized, i. e., is readily buoyantly supported by and suspended in the reaction zone by the force of the movement of the streams of reactants and reaction products thereof under the conditions prescribed by the method of the present invention.

The mol ratio of methane to chlorine, in accordance herewith, is suitably maintained substantially within the range of 1:3.6 to 1:4 to effect the chlorinolysis of methane at the temperatures prescribed above, preferably, however, of the order of 1:3.7 to 1:3.9 in order to obtain the minimum of heavy ends. It will be appreciated by those skilled in the art that the ratios given hereinabove refer to the initial or momentary concentration of the reactants at the moment they are introduced into the reaction zone either as a mixture or as separate streams of the components of the mixture, since under the conditions prescribed by the present invention the reactants, immediately upon mixing within the catalyst bed, are subject to the initial phases of the chlorination reaction. As the momentary or initial concentration of chlorine in the mixture of methane and chlorine decreases below about 3.6 mols of chlorine per mol of methane, the end products contain unduly large proportions of light ends, such as methyl chloride and methylene chloride, whereas at concentrations above a proportion of 3.9 mols of chlorine to 1 mol of methane in the reaction mixture, such end products contain unduly large proportions of heavy ends, which clog condenser passages and interrupt production.

Experience with various surface-catalysts has shown that effective fluidization is dependent in part upon the particle size and the bulk density of a particular material, and to a somewhat lesser extent, upon the cross-sectional area of the reactor, and that it is unsatisfactory to attempt to predict from specific conditions found suitable for the fluidization of a given surface-catalyst material, conditions which will be suitable for fluidization of any and all other such materials. It may be said in general, however, that surface-catalysts having a particle size of the order of 60–100 mesh and a bulk density of the order of 28–30 pounds per cubic foot are effectively fluidized, in accordance with the present invention, at space velocities of the reactant gases substantially within the range of 0.1–1.0 foot per second, where such velocities are calculated for the reactant gases at reaction temperatures and are based upon the empty reactor.

In order that those skilled in the art may better understand the method of the present invention and in what manner the same may be carried into effect, the following specific examples are offered:

*Example I*

A mixture of chlorine and methane is passed through a vertical, tubular reactor, 3 inches in diameter and 11 feet long, containing fuller's earth to the extent of about one-third the volume of the reactor. This material has a particle size ranging from 60–100 mesh, a bulk density of about 28–30 pounds/cu. ft., and is preheated to a temperature of 300° C. by passing hot gases therethrough at a velocity sufficient to fluidize the particles. The mixture of chlorine and methane is formed from separate streams of gaseous chlorine and methane which are introduced through the bottom of the reaction zone by means of two tubular conduits opening into the reaction zone so as substantially to oppose each other at a level about 4 inches above the bottom of the reactor. The flow of the gases is regulated to give 3.18 pounds of chlorine per hour and 0.19 pounds of methane per hour. During the reaction period, the maximum temperature differential over the reaction zone amounts to 5°–7° C., at a reaction temperature of 315° C. The following data are obtained:

Gas velocity, feet/second _____ 0.25
Product analysis, per cent:
    Light ends (methyl chloride, methylene chloride, etc.) _____ 0.45
    Perchlorethylene _____ 45.8
    Carbon tetrachloride _____ 44.7
    Heavy ends (hexachlorbenzene and hexachlorethane) _____ 9.13
Conversion efficiency, per cent:
    Methane _____ 31.9
    Chlorine _____ 67.4

*Example II*

The procedure of Example I is followed, except that the catalyst bed is preheated to 325° C. The flow of gases is maintained at 3.02 pounds of chlorine per hour and 0.185 pound of methane per hour. During the reaction period, the temperature in the reaction zone is maintained at 340° C., with maximum deviations within the range noted in Example I. The following data are obtained:

Gas velocity, feet/second _____ 0.25
Product analysis, per cent:
    Light ends (methyl chloride, methylene chloride, etc.) _____ 2.13
    Perchlorethylene _____ 30.3
    Carbon tetrachloride _____ 64.2
    Heavy ends (hexachlorbenzene and hexachlorethane) _____ 3.42
Conversion efficiency, per cent:
    Methane _____ 91.9
    Chlorine _____ 80.8

*Example III*

The procedure of Example I is followed, except that the catalyst bed is preheated to 340° C. The flow of gases is maintained at 3.00 pounds of chlorine per hour and 0.18 pound of methane per hour. During the reaction period, the temperature in the reaction zone is maintained at 355° C., with maximum deviations within the range noted in Example I. The following data are obtained:

Gas velocity, feet/second _____ 0.25
Product analysis, per cent:
    Light ends (methyl chloride, methylene chloride, etc.) _____ 1.0
    Perchlorethylene _____ 26.9
    Carbon tetrachloride_____ 70.0
    Heavy ends (hexachlorbenzene and hexachlorethane) _____ 2.1
Conversion efficiency, per cent:
    Methane _____ 81.0
    Chlorine _____ 72.9

*Example IV*

The procedure of Example I is followed, except that the catalyst bed is preheated to 360° C. The flow of gases is maintained at 2.9 pounds of chlorine per hour and 0.18 pound of methane per hour. During the reaction period, the temperature in the reaction zone is maintained at 370° C., with maximum deviations within the range noted in Example I. The following data are obtained:

Gas velocity, feet/second _____ 0.25
Product analysis, per cent:
    Light ends (methyl chloride, methylene chloride, etc.) _____ 1.0
    Perchlorethylene _____ 14.4
    Carbon tetrachloride_____ 82.4
    Heavy ends (hexachlorbenzene and hexachlorethane) _____ 2.2
Conversion efficiency, per cent:
    Methane _____ 37.75
    Chlorine _____ 39.15

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method for the chlorinolysis of methane which includes the steps of passing a gaseous stream of a mixture of chlorine and methane in contact with a fluidized mass of surface-catalyst particles in a reaction zone maintained at a temperature substantially within the range 300°–370° C., said catalyst being selected from the group consisting of charcoal, synthetic aluminum silicate, synthetic silica-alumina gel, silica gel and fuller's earth, said mass of particles being buoyantly supported by and suspended in said zone by the force of the motion of said stream and of the reaction products of the components thereof, the molar ratio of methane to chlorine in said stream being substantially within the range of 1:3.6 to 1:4, removing the reaction products of said mixture from contact with said mass of particles, and separating carbon tetrachloride and perchlorethylene from the other components of said reaction products.

2. The method of claim 1 in which said stream of said mixture of chlorine and methane is formed within said fluidized mass of surface-catalyst particles.

3. The method of claim 1 in which said stream of said mixture of chlorine and methane is formed at the confluence of opposing streams of said chlorine and methane in said fluidized mass of surface-catalyst particles.

4. The method of claim 1 in which the rate of flow of said gaseous stream is at a space velocity substantially within the range of 0.1–1.0 ft./sec. calculated for the reaction temperature and based upon an empty reactor, and in which the size of said surface-catalyst particles is within the range of 60–100 mesh.

References Cited in the file of this patent

UNITED STATES PATENTS

| Number | Name | Date |
|---|---|---|
| 1,394,486 | Foster | Oct. 18, 1921 |
| 2,405,395 | Bahlke et al. | Aug. 6, 1946 |
| 2,430,443 | Becker | Nov. 11, 1947 |
| 2,442,324 | Heitz et al. | May 25, 1948 |